United States Patent [19]

Kuroyama et al.

[11] Patent Number: 4,578,260

[45] Date of Patent: Mar. 25, 1986

[54] METHOD FOR PURIFYING DIAMOND

[75] Inventors: Yutaka Kuroyama, Chita; Masatada Araki, Handa, both of Japan

[73] Assignee: Nippon Oil and Fats Company Limited, Japan

[21] Appl. No.: 726,886

[22] Filed: Apr. 24, 1985

[30] Foreign Application Priority Data

May 11, 1984 [JP] Japan .................................. 59-94197

[51] Int. Cl.$^4$ ............................................. C01B 31/06
[52] U.S. Cl. ..................................... 423/446; 423/461
[58] Field of Search ................................ 423/446, 461

[56] References Cited

U.S. PATENT DOCUMENTS 3,030,188  4/1962  Eversole ............................ 423/446
3,348,918 10/1967  Kruse ................................ 423/446
3,851,027 11/1974  Balchan et al. ................. 423/446 X
3,969,489  7/1976  Wu ..................................... 423/446

OTHER PUBLICATIONS

Nagao, Chemical Abstracts, vol. 84, 1976, 84:152832v.
Young et al, Chemical Abstracts, vol. 45, 1951, 8221g.
Bragdon, Science, vol. 120, No. 3107, 1954, p. 114.

*Primary Examiner*—Edward J. Meros
*Attorney, Agent, or Firm*—Parkhurst & Oliff

[57] ABSTRACT

Diamond can be easily purified from a powdery mixture of diamond and graphite by heating the mixture together with ammonium nitrate and at least one metal oxide of lead monoxide, trilead tetroxide, magnesium oxide and zinc oxide, to oxidize the graphite powder, and removing the oxidized graphite.

1 Claim, No Drawings

METHOD FOR PURIFYING DIAMOND

BACKGROUND OF THE INVENTION (1) Field of the Invention

The present invention relates to a method for purifying diamond, and more particularly relates to a method for purifying diamond, wherein only graphite is oxidized and removed from a mixture of diamond and graphite at a relatively low temperature.

(2) Description of the Prior Art

Diamond has hitherto been artificially synthesized through a static pressure method by means of an ultra-high pressure press, a shock wave method which utilizes an instantaneous ultra-high pressure by an explosive, and the like.

However, in any of these methods, the starting graphite is not completely converted into diamond, but a mixture of diamond and graphite is always obtained.

In general, in the synthesis of diamond, in addition to the starting graphite, metals, such as iron, cobalt, nickel and the like, are used in the static pressure method; and metals, such as iron, copper and the like, are used even in the shock wave method.

These metals can be relatively easily removed by means of a mineral acid, however, it is not easy to separate diamond from graphite in the residual mixture.

Powdery mixture of graphite and diamond has various physical or chemical properties depending upon the synthetic methods for diamond. For example, diamond synthesized through the static pressure method consists of particles having a size larger than that of diamond synthesized through the shock wave method and consisting of single crystal or substantially consisting of single crystal. On the contrary, diamond synthesized through the shock wave method consists of particles generally having a size of not larger than 20-30 μm and consisting of polycrystals having a complicated shape in their surface. Accordingly, the diamond synthesized through the shock wave method has a high chemical reactivity.

The mixture of diamond and graphite obtained in the synthesis of diamond includes not only a mixture wherein diamond particles are merely mixed with graphite particles, but also a mixture wherein diamond particles are agglomerated together with graphite particles into one coarse particle, and a mixture wherein a grahite layer is put between diamond layers. Moreover, in the mixture, diamond particles and graphite particles have various and different sizes and further have different apparent densities.

Due to the above described reason, it is necessary to limit properly the method and condition for separating diamond from graphite. In the separation, physical method and chemical method are generally used.

In the physical method, diamond is separated from graphite, for example, by utilizing the difference in their specific gravity. However, this method is poor in accuracy and efficiency, and can not be practically used. Therefore, the chemical method is predominantly used at present for the separation.

In the chemical method, a powdery mixture of diamond and graphite is generally heated together with an oxidizer, whereby the graphite is oxidized and removed.

In this chemical method, there have been known wet process and dry process. In the wet process, there is used a combination of potassium dichromate and strong phosphoric acid; a combination of silver dichromate and concentrated sulfuric acid; a combination of potassium iodate and strong phosphoric acid; or a combination of nitric acid, a chlorate and an aqueous hydrogen peroxide solution. In the dry process, there is used a process, wherein a powdery mixture of diamond and graphite is heat treated together with lead oxide, alkali metal carbonate or the like.

These processes have both merits and demerits. For example, when strong phosphoric acid is used, the operation is difficult due to the high viscosity of the treating mixture; when concentrated sulfuric acid is used, the treating mixture must be kept to a high temperature, and hence the handling of the mixture is dangerous; and when potassium iodate is used, a large amount of poisonous free iodine is generated during the treatment, and hence the operation environment is injured.

Japanese Patent Application Publication No. 23,965/69 discloses a method, wherein diamond is produced from graphite by a shock wave method, and then the reaction mixture is subjected to an oxidation treatment at a temperature of about 280° C. in nitric acid. However, such high temperature treatment has a drawback that fine diamond particles are oxidized.

Japanese Patent Application Publication No. 10,949/79 discloses a method, wherein a powdery mixture of diamond and graphite is heated together with nitric acid, sodium chlorate and an aqueous hydrogen peroxide solution to carry out an oxidation treatment of the powdery mixture. However, this method has a drawbacks that environmental pollution occurs due to the development of a large amount of fume, and that a dangerous substance, such as aqueous hydrogen peroxide solution, must be handled.

In the dry process wherein a powdery mixture of diamond and graphite is oxidized in air, when lead oxide is used as an oxidation assistant, the oxidation treatment must be carried out at a high temperature of 350°–550° C. for a long time of several tens of hours, and moreover a system for recovering completely poisonous lead compounds is required, and other various troubles are caused.

Further, in a dry process wherein alkali metal carbonate is used, the treatment must be carried out at a high temperature of 550°–600° C. under an oxidizing atmosphere. When the treatment is carried out at such a high temperature, fine diamond particles synthesized by a method, such as shock wave method, are oxidized, and therefore this process is not advantageous.

The inventors have variously investigated in order to solve the above described problems in the conventional methods and have found out that a combination use of ammonium nitrate and a specifically limited metal oxide can oxidize easily only graphite at a relatively low treating temperature in a short treating time without causing oxidation of diamond.

SUMMARY OF THE INVENTION

The feature of the present invention is the provision of a method for purifying diamond, comprising heating a powdery mixtrue of diamond and graphite together with ammonium nitrate and at least one metal oxide selected from the group consisting of lead monoxide, trilead tetroxide, magnesium oxide and zinc oxide, to oxidize the graphite powder, and removing the oxidized graphite.

DESCRIPTION OF THE PREFERRED EMBODIMENT

The present invention will be explained in more detail hereinafter.

The powdery mixture of diamond and graphite to be handled in the present invention is, in general, a mixture of diamond and graphite, which is obtained in the synthesis of diamond by a static pressure method, a shock wave method and the like, and includes not only a mixture wherein diamond particles are merely mixed with graphite particles, but also a mixture wherein a part of diamond is transformed into graphite, a mixture wherein a graphite layer is put between diamond layers, and other all mixtures of diamond and graphite.

In the synthesis of diamond by the static pressure method, metal is generally used as a catalyst or solvent. In the synthesis of diamond by the shock wave method, graphite is dispersed in a metal used as a support, and a shock wave is applied to the graphite dispersed in the metal. That is, in both the methods, metal is used. In order to apply the present invention to the mixture of diamond and graphite obtained in these methods, it is necessary to remove previously the metal and to wash the residue with water before the present invention is applied to the mixture. The mixture of diamond and graphite after removal of the metal may contain diamond and graphite in any mixing ratios. Further, the mixture is not particularly limited in the particle size, because the present invention can be applied to a treatment of the mixture having a relatively large particle size by varying the treating condition, and the present invention is particularly effective for the treatment of a mixture, which has a particle size of not larger than 30 μm and is low in the treating efficiency in the conventional methods.

The specifically limited metal oxide to be used in the present invention is a metal oxide selected from the group consisting of lead monoxide, trilead tetroxide, magnesium oxide and zinc oxide. The metal oxide is used alone or in admixture of at least two metal oxides. The use of metal oxides other than that specified in the present invention can not attain satisfactorily the object of the present invention.

The specifically limited metal oxide of the present invention is used at least 0.5 mole, preferably about 1-5 moles, per 1 mole of carbon.

As the ammonium nitrate to be used in combination with the above specifically limited metal oxide, nonadditive ammonium nitrate is used. The reason is that ammonium nitrate containing organic substances incorporated therein may be vigrously burnt or exploded under a certain condition.

The use amount of ammonium nitrate is at least 0.8 mole per 1 mole of carbon, preferably about 5-10 times amount of its theoretical amount in the case where the following reaction formula is assumed:

$$4NH_4NO_3 + 5C \rightarrow 2H_2O + 5CO_2 + 2N_2 + 4NH_3$$

When the amount of ammonium nitrate is less than 0.8 mole, the effect of the present invention does not fully appear. Even when the amount exceeds 10 times amount of the theoretical amount, the effect is not so improved as compared with the effect in the use of 10 times amount of the theoretical amount, and the use of such large amount is disadvantageous in view of economy.

The treating temperature in the present invention is a temperature lower than the melting point (169.6° C.) of ammonium nitrate, and is preferably about 120°–160° C. When the treating temperature is lower than 120° C., graphite is difficult to be oxidized. When the temperature exceeds 160° C., a large amount of ammonium nitrate is lost, and further is disadvantageous in view of safeness.

In the present invention, in order to remove efficiently graphite from a powdery mixture of diamond and graphite, it is preferable to carry out repeatedly an operation, wherein the powdery mixture is heated together with a specifically limited metal oxide and ammonium nitrate to oxidize the graphite powder.

The treating time per one operation is preferably about 30 minutes in order that diamond produced in the synthesis is not lost by oxidation. For example, a powdery mixture of diamond and graphite is heated at 120°–160° C. for 30 minutes together with given amounts of a specifically limited metal oxide and ammonium nitrate to oxidize the graphite, and diamond is separated from the mass by an ordinary method. That is, the oxidized graphite and the metal oxide are dissolved in a mineral acid, the mineral acid is neutralized, the supernatant liquid is removed by the decantation, water is added to the residue, the supernatant liquid is removed by the decantation to separate the residue, and then the residue is dried. The dried residue is repeatedly subjected to the above described oxidation treatment to oxidize repeatedly graphite, and the graphite is separated from diamond.

The total time required for the oxidation treatment of graphite varies depending upon the amount ratio of diamond to graphite in the mixture of the diamond and the graphite. However, graphite can be completely removed in about 5–10 hours.

A very small amount of ammonia gas, which is generated during the oxidation treatment, is removed by passing the generated gas through an absorber (which uses, for example, diluted hydrochloric acid as an absorbing liquid) and by absorbing the ammonia gas in the liquid.

According to the above described method for puring diamond of the present invention, only graphite can be surely oxidized and removed without oxidizing diamond. Moreover, the method of the present invention is low in the operation temperature, is short in the operation time and is safe in the operation itself as compared with those in the conventional methods, and is a useful method in industry.

The following examples are given for the purpose of illustration of this invention and are not intended as limitations thereof.

EXAMPLE 1

Experiments were effected according to the following method under the condition shown in Table 1.

A shock wave of an explosive was given to a mixture of metal (iron powder) and graphite to synthesize diamond. The resulting reaction mixture was treated with a mineral acid (hydrochloric acid) to remove the metal, and the residue was neutralized, washed with water and dried to obtain graphite powder containing diamond particle. In an alumina mortar were fully mixed 2.5 g of the resulting powdery mixture, 50 g of ammonium nitrate and 5 g of magnesium oxide, and the resulting mixture was charged into a round-bottom flask, heated by means of a mantle heater and kept at 150° C. for 30 minutes. The reaction mixture was left to stand to be cooled to room temperature, and then diluted hydrochloric acid was charged into the flask. After the hydrochloric acid was neutralized, the supernatant liquid was removed by the decantation, water was added to the residue, the supernatant liquid was removed by the decantation, whereby the residue was separated.

The above described treatment was repeated by 10 times, and the resulting residue was dried to obtain 0.32 g of a powdery substance. When the diffraction spectrum of the substance was scanned by the powder X-ray diffractometry, the peak of the spectrum was the same as that of the single sphase of diamond, and it was ascertained that graphite had been completely removed.

When diamond alone was treated under the same condition as described above, the amount of the diamond was not at all decreased. That is, it was ascertained that diamond was not at all oxidized.

EXAMPLES 2-6

A powdery mixture of diamond and graphite was treated according to the method described in Example 1 under the condition shown in Table 1. The obtained results are shown in Table 1.

COMPARATIVE EXAMPLES 1 and 2

A powdery mixture of diamond and graphite was treated according to the method described in Example 1 under the condition shown in Table 1, wherein ammonium nitrate and magnesium oxide used in Example 1 were replaced by a combination of nitric acid, concentrated sulfuric acid and strong phosphoric acid or a combination of nitric acid, sodium chlorate and an aqueous hydrogen peroxide solution. The obtained results are shown in Table 1.

The synthetic methods for diamond used in the Examples and Comparative examples are all shock wave methods.

TABLE 1

|  | Example |  |  |  |  |  | Comparative example |  |
|---|---|---|---|---|---|---|---|---|
|  | 1 | 2 | 3 | 4 | 5 | 6 | 1 | 2 |
| Mixture of diamond and graphite (g) | 2.5 | 0.5 | 0.5 | 0.5 | 0.36 | 2.9 | 5 | 5 |
| Ammonium nitrate (g) | 50 | 10 | 15 | 10 | 10 | 30 | — | — |
| 35% aqueous solution of nitric acid (cc) | — | — | — | — | — | — | 3,000 | 1,000 |
| Metal oxide |  |  |  |  |  |  |  |  |
| PbO (g) | — | — | — | 3 | 2.5 | — | — | — |
| $Pb_3O_4$ (g) | — | 5 | — | — | — | — | — | — |
| MgO (g) | 5 | — | — | — | 2.5 | 4 | — | — |
| ZnO (g) | — | — | 5 | — | — | — | — | — |
| Sodium chlorate (g) | — | — | 5 | — | — | — | — | 350 |
| 30% aqueous solution of hydrogen peroxide (cc) | — | — | — | — | — | — | — | 1,000 |
| Concentrated sulfuric acid (cc) | — | — | — | — | — | — | 450 | — |
| Strong phosphoric acid (cc) | — | — | — | — | — | — | 50 | — |
| Treating condition |  |  |  |  |  |  |  |  |
| temperature (°C.) | 150 | 150 | 160 | 140 | 150 | 150 | 320 | 90 |
| *time (hr) | 0.5 | 0.5 | 0.5 | 0.5 | 0.5 | 0.5 | 2.5 | 5 |
| number of repeating cycles | 10 | 19 | 20 | 15 | 16 | 18 | 4 | 5 |
| total time (hr) | 5 | 8.5 | 10 | 7.5 | 8 | 9 | 10 | 25 |
| Residue (g) | 0.32 | 0.04 | 0.04 | 0.03 | 0.05 | 0.37 | 1.5 | 0.3 |
| X-ray diffractometry (peak) | single peak due to diamond only | single peak due to diamond only | single peak due to diamond only | single peak due to diamond only | single peak due to diamond only | single peak due to diamond only | $2\theta = 26.8°$, distinct peak due to graphite | $2\theta = 26.8°$, distinct peak due to graphite |

*time per one cycle of treatment

What is claimed is:

1. A method for purifying diamond, comprising heating a powdery mixture of diamond and graphite together with ammonium nitrate and at least one metal oxide selected from the group consisting of lead monoxide, trilead tetroxide, magnesium oxide and zinc oxide, to oxidize the graphite powder, and removing the oxidized graphite.

* * * * *